W. M. ROHN.
BALL BEARING.
APPLICATION FILED JAN. 2, 1917.
1,325,113.
Patented Dec. 16, 1919.
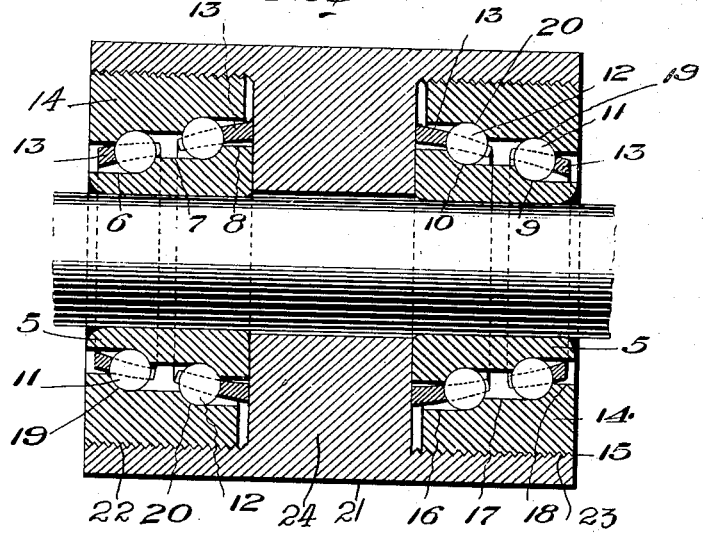
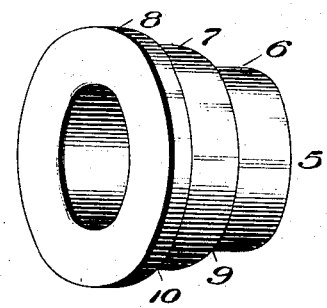
Inventor
William M. Rohn
Witness
By David P. Moore.
Attorney

UNITED STATES PATENT OFFICE.

WILLIAM M. ROHN, OF DETROIT, MICHIGAN, ASSIGNOR TO SALISBURY BALL BEARING CORPORATION, A CORPORATION OF NEW YORK.

BALL-BEARING.

1,325,113.      Specification of Letters Patent.      Patented Dec. 16, 1919.

Application filed January 2, 1917. Serial No. 140,133.

*To all whom it may concern:*

Be it known that I, WILLIAM M. ROHN, a citizen of the United States, residing at Detroit, in the county of Wayne and State of Michigan, have invented certain new and useful Improvements in Ball-Bearings, of which the following is a specification, reference being had therein to the accompanying drawing.

This invention relates to improvements in ball bearings, one object of the invention being the provision of a bearing in which a plurality of raceway carrying members are provided upon the boxing and shaft, whereby any wear in the respective raceways of such members may be taken care of by the adjustment of either of the members, the balls being preferably carried in the retainers of any desired construction so as to be properly maintained relative to each other.

A further object of this invention is the provision of a ball bearing in which the inner surface of the member is formed with a plurality of stepped portions of relatively wide area and which in turn provide curved shoulders for the reception of the respective series of balls, while the axle is provided with a corresponding stepped member having rounded shoulders which abut the respective series of balls and thus maintain such series relative to the raceways of the boxing, whereby any wear upon the raceways longitudinally of the boxing or shaft may be taken care of by the simple adjustment of either one of these elements.

In the accompanying drawings:

Figure 1 is a longitudinal sectional view through the complete ball bearing, the boxing or outer sleeve being the adjustable element.

Fig. 2 is a perspective view of the inner bearing sleeve.

Referring to the drawings, the numeral 5 designates the inner bearing sleeve which is here shown as formed with the three diametered portions 6, 7 and 8, respectively, the curved shouldered portions or raceways 9 and 10 forming the raceways for the respective series 11 and 12 of balls which are carried in their respective retaining rings 13.

The outer bearing sleeve 14 which is adjustably mounted in place by means of the threaded connection 15 here shown, is provided with the three diametered portions 16, 17 and 18, which provide in turn the two curved shouldered portions or raceways 19 and 20. Thus when the bearing is in normal position with the series 11 of the balls in position, the raceways 9 and 19 coöperate while the series 12 are disposed between the raceways 10 and 20 so that all end thrust will be taken care of and any wear upon either of the raceways may be accommodated by merely adjusting the outer bearing sleeve 14.

A cylindrical sleeve or casing 21 is provided having its opposite ends internally threaded as at 22 and 23 for adjustable and removable reception of the opposite outer bearing sleeves 14. The casing 21 is further provided with a relatively wide central internal annular flange 24 which acts as a partition to separate the opposite inner bearing sleeves 5, said sleeves 5 being operatively disposed with their inner end faces against the opposite side faces of the flange 24. This construction provides a durable and efficient twin multiple row ball bearing.

It will thus be seen that there is sufficient radius between the tapered point and the shoulder of each of the bearing sleeves to form practically a raceway when the two series of balls are placed in proper position with their radial or end thrust load. By this means the bearing when slightly worn may be readily adjusted by moving one of the bearing sleeves toward the other, here shown as the outer sleeve, so as to produce practically a new ball bearing at each adjustment.

It will be noted that the cylindrical portion of each member 5 or 14 is relatively long as compared to the diameter of the balls, so that the balls may be held properly spaced in series and providing for a longer bearing with two spaced supports.

I am aware of the fact that bearings have been provided in which the cone or inner bearing sleeve is provided with two raceways while the outer ball bearing sleeve is perfectly smooth and tapered but I have found in practice that the outer bearing sleeve must be similarly provided to accommodate itself to the adjustment herein set forth and thus provides an exceedingly practical and durable bearing.

It will be noted from the foregoing description and the showing in the drawings, that each of said bearings is provided with a plurality of interrupted raceways and that any wear can be compensated for by merely adjusting either of the bearing surfaces or sleeves longitudinally relatively to the other.

What I claim as new is:

A twin multiple row ball bearing including a cylindrical casing having internally threaded opposite ends and provided with a relatively wide central internal annular flange, an inner bearing sleeve removably positioned within each end of said casing with its inner end face contacting the adjacent side face of said flange, an outer bearing sleeve removably and adjustably threaded within each end of said casing spaced from and surrounding the adjacent inner bearing sleeve, the opposed faces of said sleeves being provided with a plurality of stepped cylindrical surfaces, the shoulder portions of which are curved to constitute annular ball races, and a plurality of series of balls interposed between the races of the sleeves.

In testimony whereof I affix my signature in presence of two witnesses.

WILLIAM M. ROHN.

Witnesses:
 JAMES WILSON,
 I. J. WILSON.